US012756445B2

(12) United States Patent
Jacobsson et al.

(10) Patent No.: US 12,756,445 B2
(45) Date of Patent: Oct. 6, 2026

(54) METHODS AND NODES TO PERFORM PRECODER CANDIDATE RESTRICTION FOR MULTI-ANTENNA UE

(71) Applicant: TELEFONAKTIEBOLAGET LM ERICSSON (PUBL), Stockholm (SE)

(72) Inventors: Sven Jacobsson, Gothenburg (SE); Andreas Nilsson, Gothenburg (SE); Claes Tidestav, Stockholm (SE); Daniele Davoli, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/859,652

(22) PCT Filed: Apr. 27, 2023

(86) PCT No.: PCT/IB2023/054383

§ 371 (c)(1),
(2) Date: Oct. 24, 2024

(87) PCT Pub. No.: WO2023/209635

PCT Pub. Date: Nov. 2, 2023

(65) Prior Publication Data

US 2025/0293749 A1 Sep. 18, 2025

Related U.S. Application Data

(60) Provisional application No. 63/335,437, filed on Apr. 27, 2022.

(51) Int. Cl.
*H04B 7/06* (2006.01)
*H04B 7/0456* (2017.01)

(52) U.S. Cl.
CPC ......... *H04B 7/0639* (2013.01); *H04B 7/0456* (2013.01); *H04B 7/0481* (2023.05); *H04B 7/061* (2013.01); *H04B 7/0691* (2013.01)

(58) Field of Classification Search
CPC .. H04B 7/0404; H04B 7/0408; H04B 7/0456; H04B 7/046; H04B 7/0473;
(Continued)

(56) References Cited

U.S. PATENT DOCUMENTS

2013/0083743 A1* 4/2013 Koo ..................... H04B 7/0456 370/329
2017/0201300 A1* 7/2017 Parkvall ................ H04L 5/0051
(Continued)

FOREIGN PATENT DOCUMENTS

WO 2023209599 A1 11/2023

OTHER PUBLICATIONS

3GPP TS 38.211 V17.1.0 (Mar. 2022) 3rd Generation Partnership Project; Technical Specification Group Radio Access Network; NR; Physical channels and modulation (Release 17).
(Continued)

*Primary Examiner* — Young T. Tse
(74) *Attorney, Agent, or Firm* — Ericsson Inc.

(57) ABSTRACT

There is provided method performed by a user equipment (UE) configured with 8 or more transmit antenna ports ($N_{TX}$). The method comprises: receiving a precoding indication which indicates a precoder in a subset of precoders, where the subset of precoders corresponds to a plurality of precoders associated with $N_{TX}$/Ng transmit antenna ports, where Ng is a number of transmit antenna port groups; and transmitting a data transmission using the indicated precoder to a network node. A UE to perform this method is also provided.

20 Claims, 7 Drawing Sheets

(58) Field of Classification Search
CPC ...... H04B 7/0481; H04B 7/061; H04B 7/063; H04B 7/0639; H04B 7/0691; H04B 7/0695
USPC ....... 375/241, 242, 254, 260, 265, 267, 285, 375/296, 358; 370/278, 282, 334; 455/63.1, 67.13, 69, 70, 500, 501
See application file for complete search history.

(56) References Cited

U.S. PATENT DOCUMENTS

| | | | | |
|---|---|---|---|---|
| 2018/0131420 | A1* | 5/2018 | Faxér | H04B 7/0469 |
| 2019/0207731 | A1* | 7/2019 | Park | H04B 7/0486 |
| 2020/0083939 | A1* | 3/2020 | Park | H04L 25/0226 |
| 2020/0162133 | A1* | 5/2020 | Harrison | H04W 52/248 |
| 2021/0281448 | A1 | 9/2021 | Li | |
| 2021/0359805 | A1* | 11/2021 | Petersson | H04W 72/04 |

OTHER PUBLICATIONS

3GPP TS 38.213 17.10.0 (Jul. 2024) 5G; 3rd Generation Partnership Project; Technical Specification Group Radio Access Network; NR; Physical layer procedures for control, (Release 17).

3GPP TS 38.331 V17.0.0 (Mar. 2022) “3rd Generation Partnership Project; Technical Specification Group Radio Access Network; NR; Radio Resource Control (RRC) protocol specification (Release 17)”, Technical Specification, , 1221 Pages.

3GPP, “3rd Generation Partnership Project; Technical Specification Group Radio Access Network; NR; Multiplexing and channel coding (Release 17)”, Mar. 2022, 3GPP TS 38.212 V17.1.0 (Mar. 2022).

3GPP, “3rd Generation Partnership Project; Technical Specification Group Radio Access Network; NR; Physical layer procedures for data (Release 17)”, Mar. 2022, pp. 1-225, TS 38.214 17.1.0.

* cited by examiner

METHODS AND NODES TO PERFORM PRECODER CANDIDATE RESTRICTION FOR MULTI-ANTENNA UE

RELATED APPLICATIONS

This application claims the benefits of priority of U.S. Provisional Patent Application No. 63/335,437, entitled "Precoder candidate restriction for multi-antenna UE" and filed at the United States Patent and Trademark Office (USPTO) on Apr. 27, 2022.

TECHNICAL FIELD

This application relates generally to wireless networks, and more specifically to techniques for performing precoder candidate restriction for multi-antenna UEs.

BACKGROUND

Ul Transmission/Precoding Schemes

The channel that carries data in the NR UL is called Physical Uplink Shared Channel (PUSCH). In NR, there are two possible waveforms that can be used for PUSCH: Cyclic Prefix (CP)-Orthogonal Frequency Division Multiplex (OFDM) and Discrete Fourier Transform (DFT)-S-OFDM. Also, there are two transmission schemes specified for PUSCH: Codebook (CB)-based precoding and Non-Codebook (NCB)-based precoding.

The next generation or NR NodeB (gNB) configures, in Radio Resource Control (RRC), the transmission scheme through the higher-layer parameter txConfig in the PUSCH-Config Information Element (IE). CB-based transmission can be used for non-calibrated User Equipments (UEs) and/or for Frequency Division Duplexing (FDD), i.e., UL/DL reciprocity does not need to hold. NCB-based transmission, on the other hand, relies on UL/DL reciprocity and is, hence, intended for Time Division Duplexing (TDD).

Cb-Based Precoding

CB-based PUSCH is enabled if the higher-layer parameter txConfig is set to 'codebook'. For dynamically scheduled PUSCH with configured grant type 2, CB-based PUSCH transmission can be summarized in the following steps:

1. The UE transmits a Sounding Reference Signal (SRS), configured in an SRS resource set with higher-layer parameter usage in SRS-Config IE set to 'codebook'. Up to two SRS resources (for testing up to two virtualizations/beams/panels) each with up to four ports, can be configured in the SRS resource set.

2. The gNB determines the number of layers (or rank) and a preferred precoder, i.e., Transmit Precoding Matrix Index (TPMI), from a codebook subset based on the received SRS from one of the SRS resources. The codebook subset is configured via the higher-layer parameter codebookSubset, based on reported UE capability, and is one of:
   a. fully coherent ('fullyAndPartialAndNonCoherent'), or
   b. partially coherent ('partialAndNonCoherent'), or
   c. non-coherent ('nonCoherent'), 3. If two SRS resources are configured in the SRS resource set, the gNB indicates the selected SRS resource via a 1-bit SRS Resource Indicator (SRI) field in the Downlink Control Information (DCI) scheduling the PUSCH transmission. If only one SRS resource is configured in the SRS resource set, the SRI field is not indicated in DCI.

4. The gNB indicates, via DCI, the number of layers and the TPMI. Demodulation (DM)-RS port(s) associated with the layer(s) are also indicated in DCI. The number of bits in DCI used for indicating the number of layers (if transform precoding is enabled, the number of PUSCH layers is limited to 1) and the TPMI is determined as follows (unless UL full-power transmission is configured, for which the number of bits may be different):
   a. 4, 5, or 6 bits if the number of antenna ports is 4, if transform precoding is disabled, and if the higher-layer parameter maxRank in PUSCH-Config IE is set to 2, 3, or 4 (see Table 1 below).
   b. 2, 4, or 5 bits if the number of antenna ports is 4, if transform precoding is disabled or enabled, and if the higher-layer parameter maxRank in PUSCH-Config IE is set to 1 (see Table 2 below).
   c. 2 or 4 bits if the number of antenna ports is 2, if transform precoding is disabled, and if the higher-layer parameter maxRank in PUSCH-Config IE is set to 2 (see Table 3 below).
   d. 1 or 3 bits if the number of antenna ports is 2, if transform precoding is disabled or enabled, and if the higher-layer parameter maxRank in PUSCH-Config IE is set to 1 (see Table 4 below).
   e. 0 bits if 1 antenna port is used for PUSCH transmission.

5. The UE performs PUSCH transmission over the antenna ports corresponding to the SRS ports in the indicated SRS resource.

Table 1 below shows precoding information for different numbers of layers and 4 antenna ports.

TABLE 1

Precoding information and number of layers, for 4 antenna ports, if transform precoding is disabled and maxRank = 2, 3 or, 4 (reproduced from Table 7.3.1.1.2-2 of 3GPP TS 38.212)

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| . . . | . . . | . . . | . . . | . . . | . . . |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| . . . | . . . | . . . | . . . | | |

TABLE 1-continued

Precoding information and number of layers, for 4 antenna ports, if transform precoding is disabled and maxRank = 2, 3 or, 4 (reproduced from Table 7.3.1.1.2-2 of 3GPP TS 38.212)

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 19 | 1 layer: TPMI = 11 | 19 | 1 layer: TPMI = 11 | | |
| 20 | 2 layers: TPMI = 6 | 20 | 2 layers: TPMI = 6 | | |
| . . . | . . . | . . . | . . . | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layer: TPMI = 12 | | | | |
| . . . | . . . | | | | |
| 47 | 1 layer: TPMI = 27 | | | | |
| 48 | 2 layers: TPMI = 14 | | | | |
| . . . | . . . | | | | |
| 55 | 2 layers: TPMI = 21 | | | | |
| 56 | 3 layers: TPMI = 3 | | | | |
| . . . | . . . | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

Furthermore, Tables 7.3.1.1.2-3, 7.3.1.1.2-4 and 7.3.1.1.2-5 of 3GPP TS 38.212 show precoding information for different numbers of layers, and different antenna ports.

For a given number of layers, the TPMI field indicates a precoding matrix that the UE should use for PUSCH. In a first example, if the number of antenna ports is 4, the number of layers is 1, and if transform precoding is disabled, then the set of possible precoding matrices is shown in Table 2. In a second example, if the number of antenna ports is 4, the number of layers is 4, and if transform precoding is disabled, then the set of possible precoding matrices is shown in Table 3.

TABLE 2

Precoding matrix, W, for single-layer transmission using four antenna ports when transform precoding is disabled (reproduced from Table 6.3.1.5-3 of 3GPP TS 38.211)

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

TABLE 3

Precoding matrix, W, for four-layer transmission using four antenna ports when transform precoding is disabled (reproduced from Table 6.3.1.5-7 of 3GPP TS 38.211).

| TPMI index | W (ordered from left to right in increasing order of TPMI index) | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | — | — | — |

NCB-Based Precoding

NCB-based UL transmission is for reciprocity-based UL transmission in which SRS precoding is derived at a UE based on Channel State Information (CSI)-RS received in the DL. Specifically, the UE measures received CSI-RS and deduces suitable precoder weights for SRS transmission(s), resulting in one or more (virtual) SRS ports, each corresponding to a spatial layer.

A UE can be configured with up to four SRS resources, each with a single (virtual) SRS port, in an SRS resource set with higher-layer parameter usage in SRS-Config IE set to 'nonCodebook'. A UE transmits the up to four SRS resources and the gNB measures the UL channel based on the received SRS and determines the preferred SRS resource (s). Next, the gNB indicates the selected SRS resources via the SRI field in the DCI and the UE uses this information to precode PUSCH with a transmission rank that equals the number of indicated SRS resources (and, hence, the number of SRS ports).

SRS

In NR, the SRS is used for providing CSI to the gNB in the UL. The usage of SRS includes, e.g., deriving the appropriate transmission/reception beams and/or to perform link adaptation (i.e., setting the transmission rank and the Modulation Coding Scheme (MCS)), and for selecting DL (e.g., for Physical Downlink Shared Channel (PDSCH) transmissions) and UL (e.g., for PUSCH transmissions) Multi-Input Multi-Output (MIMO) precoding.

In Long Term Evolution (LTE) and NR, the SRS is configured via RRC, where parts of the configuration can be updated (for reduced latency) through Medium Access Control (MAC)-Control Element (CE) signaling. The configuration includes, for example, the SRS resource allocation (the physical mapping and the sequence to use) as well as the time-domain behavior (aperiodic, semi-persistent, or periodic). For aperiodic SRS transmission, the RRC configuration does not activate an SRS transmission from the UE but instead a dynamic activation trigger is transmitted from the gNB in the DL, via the DCI in the Physical Downlink Control Channel 15 (PDCCH) which instructs the UE to transmit the SRS once, at a predetermined time.

When configuring SRS transmissions, the gNB configures, through the SRS-Config IE, a set of SRS resources and a set of SRS resource sets, where each SRS resource set contains one or more SRS resources. The configuration of a SRS resource or a SRS resource set is given by 3GPP TS 38.331 version 16.1.0. For example, the SRS-Resource information element (IE) and the SRS-Resource Set IE can be found in Clause 6.3.2.

An SRS resource is configurable with respect to, e.g.:

1. The number of SRS ports (1, 2, or 4), configured by the RRC parameter nrofSRS-Ports.

2. The transmission comb (i.e., mapping to every 2nd or 4th subcarrier), configured by the RRC parameter transmissionComb, which includes:
   - a. The comb offset, configured by the RRC parameter combOffset, is specified (i.e., which of the combs that should be used).
   - b. The cyclic shift, configured by the RRC parameter cyclicShift, that configures a (port-specific, for multi-port SRS resources) cyclic shift for the Zadoff-Chu sequence that is used for SRS. The use of cyclic shifts increases the number of SRS resources that can be mapped to a comb (as SRS sequences are designed to be (almost) orthogonal under cyclic shifts), but there is a limit on how many cyclic shifts that can be used (8 for comb 2 and 12 for comb 4).

3. The time-domain position within a given slot, configured with the RRC parameter resourceMapping, which includes:
   - a. The time-domain start position, which is limited to be one of the last 6 symbols (in NR Rel-15) or in any of the 14 symbols in a slot (in NR Rel-16), configured by the RRC parameter startPosition.
   - b. The number of symbols for the SRS resource (that can be set to 1, 2 or 4), configured by the RRC parameter nrofSymbols.
   - c. The repetition factor (that can be set to 1, 2 or 4), configured by the RRC parameter repetitionFactor. When the repetition factor is larger than 1, the same frequency resources are used multiple times across symbols, used to improve the coverage as this allows more energy to be collected by the receiver.

4. The sounding bandwidth, frequency-domain position and shift, and frequency-hopping pattern of an SRS resource (i.e., which part of the transmission bandwidth that is occupied by the SRS resource) is set through the RRC parameters freqDomainPosition, freqDomainShift, and the freqHopping parameters c-SRS, b-SRS, and b-hop. The smallest possible sounding bandwidth is 4 RBs.

5. The RRC parameter resourceType determines whether the SRS resource is transmitted as periodic, aperiodic (singe transmission triggered by DCI), or semi persistent (same as periodic except for the start and stop of the periodic transmission is controlled through MAC-CE signaling instead of RRC signaling).

6. The RRC parameter sequenceId specifies how the SRS sequence is initialized.

7. The RRC parameter spatialRelationInfo configures the spatial relation for the SRS beam with respect to another RS (which could be another SRS, a Synchronization Signal Block (SSB) or a CSI-RS). If an SRS resource has a spatial relation to another SRS resource, then this SRS resource should be transmitted with the same beam (i.e., virtualization) as the indicated SRS resource.

An illustration of how an SRS resource could be allocated in time and frequency within a slot (note that semi-persistent/periodic SRS resources typically span several slots), is provided in FIG. 1. In NR Rel-16, the additional (and optional) RRC parameter resourceMapping-r16 was introduced. If resourceMapping-r16 is signaled, the UE shall ignore the RRC parameter resourceMapping. The difference between resourceMapping-r16 and resourceMapping is that the SRS resource (for which the number of OFDM symbols and the repetition factor is still limited to 4) can start in any of the 14 OFDM symbols in a slot configured by the RRC parameter startPosition-r16.

SRS resource(s) will be transmitted as part of an SRS resource set, where all SRS resources in the same SRS resource set must share the same resource type. An SRS resource set is configurable with respect to, e.g.:

1. For aperiodic SRS, the slot offset is configured by the RRC parameter slotOffset and sets the delay from the PDCCH trigger reception to the start of the SRS transmission.

2. The resource usage, which is configured by the RRC parameter usage sets constraints and assumptions on the resource properties (see 3GPP TS 38.214 for further details). The SRS resource sets can be configured with one of four different usages: 'antennaSwitching', 'codebook', 'nonCodebook' and 'beamManagement'.

3. An SRS resource set that is configured with usage 'antennaSwitching' is used for reciprocity-based DL precoding (i.e., used to sound the channel in the UL so that the gNB can use reciprocity to set a suitable DL precoders). The UE is expected to transmit one SRS port per UE antenna port.

a. An SRS resource set that is configured with usage 'codebook' is used for CB-based UL transmission (i.e., used to sound the different UE antennas and help the gNB to determine/signal a suitable UL precoder, transmission rank, and MCS for PUSCH transmissions). There are up to two SRS resources in an SRS resource set with usage 'codebook'. How SRS ports are mapped to UE antenna ports is, however, up to UE implementation and not known to the gNB.

b. An SRS resource set that is configured with usage 'nonCodebook' is used for NCB-based UL transmission. Specifically, the UE transmits one SRS resource per candidate beam (suitable candidate beams are determined by the UE based on CSI-RS measurements in the DL and, hence, reciprocity needs to hold). The gNB can then, by indicating a subset of these SRS resources, determine which UL beam(s) that the UE should apply for PUSCH transmission. One UL layer will be transmitted per indicated SRS resource. Note that how the UE maps SRS ports to antenna ports is up to UE implementation and not known to the gNB.

4. The associated CSI-RS (this configuration is only applicable for NCB-based UL transmission) for each of the possible resource types.

a. For an aperiodic SRS, the associated CSI-RS resource is set by the RRC parameter csi-RS.

b. For semi-persistent/periodic SRS, the associated CSI-RS resource is set by the RRC parameter associatedCSI-RS.

To summarize, the SRS resource-set configuration determines, e.g., usage, power control, and slot offset for aperiodic SRS. The SRS resource configuration determines the time-and-frequency allocation, the periodicity and offset, the sequence, and the spatial-relation information.

SUMMARY

There currently exist certain challenge(s). As explained above, legacy NR CB-based UL transmission is limited to up to 4 ports (and up to 4 layers). For NR Rel-18, it is discussed to support up to 8 ports (and, possibly, more than 4 layers) for UL transmission.

How the gNB should configure a precoding matrix and transmission rank for 8 Tx or more (and, possibly, 6 Tx) UEs is still an open issue. With a large set of precoding matrices to cover all possible UE antenna architectures and UE capabilities, the downlink control information (DCI) overhead would be large.

Certain aspects of the disclosure and their embodiments may provide solutions to these or other challenges.

For example, the UE can select a precoder from a subset of the available precoders. The TPMI received by the UE indicates one of the precoders in the subset of available precoders. The subset is defined by predetermined rules or by the network (NW) configuration and may depend on UE capability signaling.

More specifically, there is provided a method in a UE. The method comprises: receiving a precoding indication which indicates a precoder in a subset of precoders, the subset of precoders corresponding to a plurality of precoders associated with $N_{TX}/Ng$ transmit antenna ports, where Ng is a number of transmit antenna port groups; and transmitting a data transmission using the indicated precoder to a network node. A UE is also configured to perform this method. There is also provided a method in a network node. The method comprises: determining a subset of precoders, the subset of precoders corresponding to a plurality of precoders associated with $N_{TX}/Ng$ transmit antenna ports, where Ng is a number of transmit antenna port groups; transmitting a precoding indication which indicates a precoder from the determined subset of precoders; and receiving, from the UE, a transmission using the indicated precoder. A network node is also configured to perform this method.

Certain embodiments may provide one or more of the following technical advantage(s).

The proposed solutions ensure that the set (or subset) of possible precoding matrices is adapted/restricted to fit a multi-antenna UE, without increasing the DCI overhead.

Furthermore, the proposed solutions limit the amount of DCI overhead required for the gNB to signal a selected TPMI to the 8 Tx UE.

BRIEF DESCRIPTION OF THE DRAWINGS

Exemplary embodiments will be described in more detail with reference to the following figures, in which.

DETAILED DESCRIPTION

Some of the embodiments contemplated herein will now be described more fully with reference to the accompanying drawings. Embodiments are provided by way of example to convey the scope of the subject matter to those skilled in the art.

It should be noted that the terms "antenna ports", "transmit antenna ports" and "antenna elements" can be used interchangeably in this disclosure.

Figure 1:
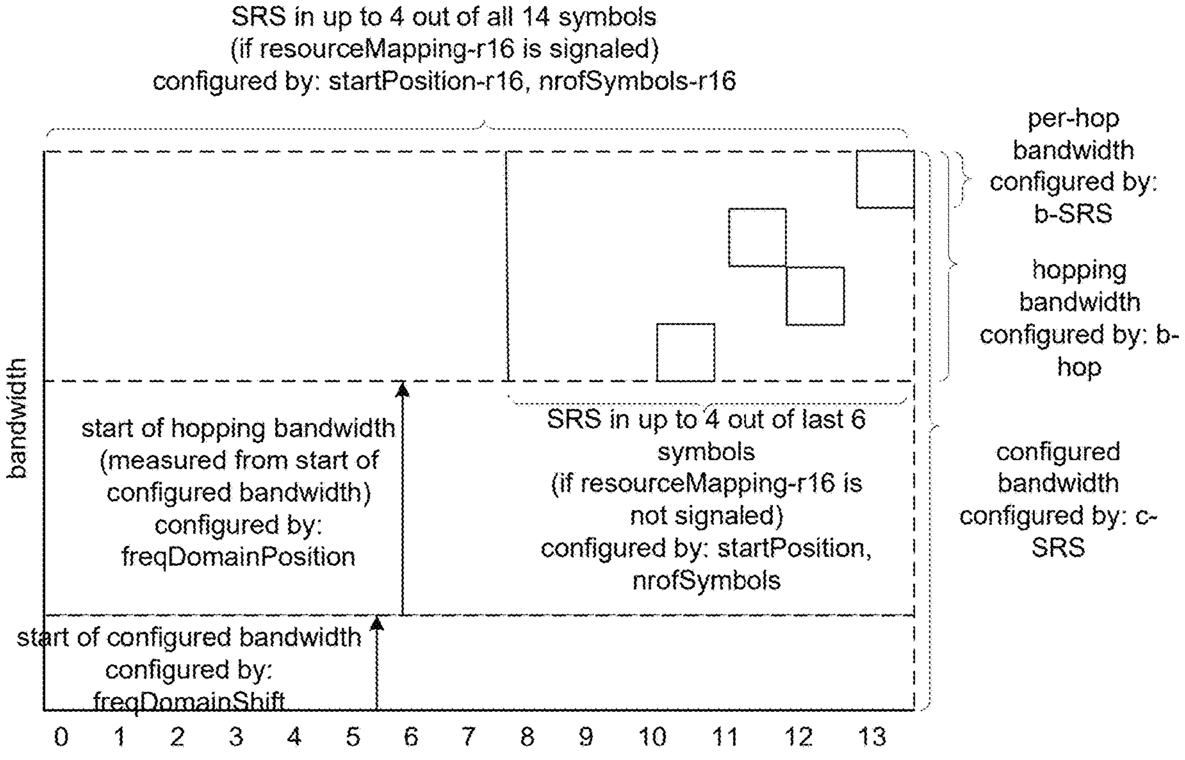
FIG. 1 (Prior Art)
FIG. 1 illustrates an example of a schematic description of how an SRS resource could be allocated in time and frequency within a slot if resourceMapping-r16 is not signaled.
Figure 2:
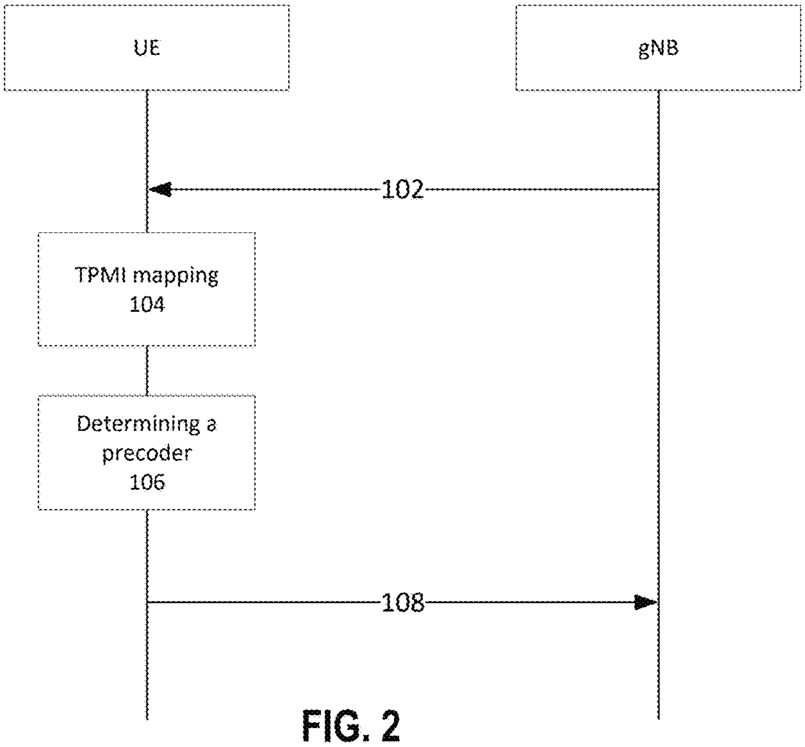
FIG. 2 illustrates an example of a signaling diagram between and UE and a network node for selecting a precoder.

FIG. 2 illustrates a signaling diagram of a method between a UE and a gNB for configuring CB-based UL transmissions of a physical channel (e.g., PUSCH). The UE may be configured with up to 8 or more antenna ports. For example, in step 102, the UE receives a TPMI (or precoding information/indication which may also comprise rank information) from the gNB. In step 104, the UE maps the TPMI to a precoder out of a restricted set of precoders. In step 106, the UE determines a precoder based on the precoder index. In step 108, the UE transmits PUSCH using the determined precoder.

The restricted set of precoders can be determined:

A) by a predetermined rule, e.g., based on UE capability signaling;

B) by RRC or MAC CE configuration, i.e., the NW provides the UE with the TMPI-to-precoder mapping separate from the DCI; or C) by an explicit indication in the DCI, e.g., by a new DCI field.

More details regarding the method are provided below.

Precoder Restriction and DCI Signaling

Figure 3:
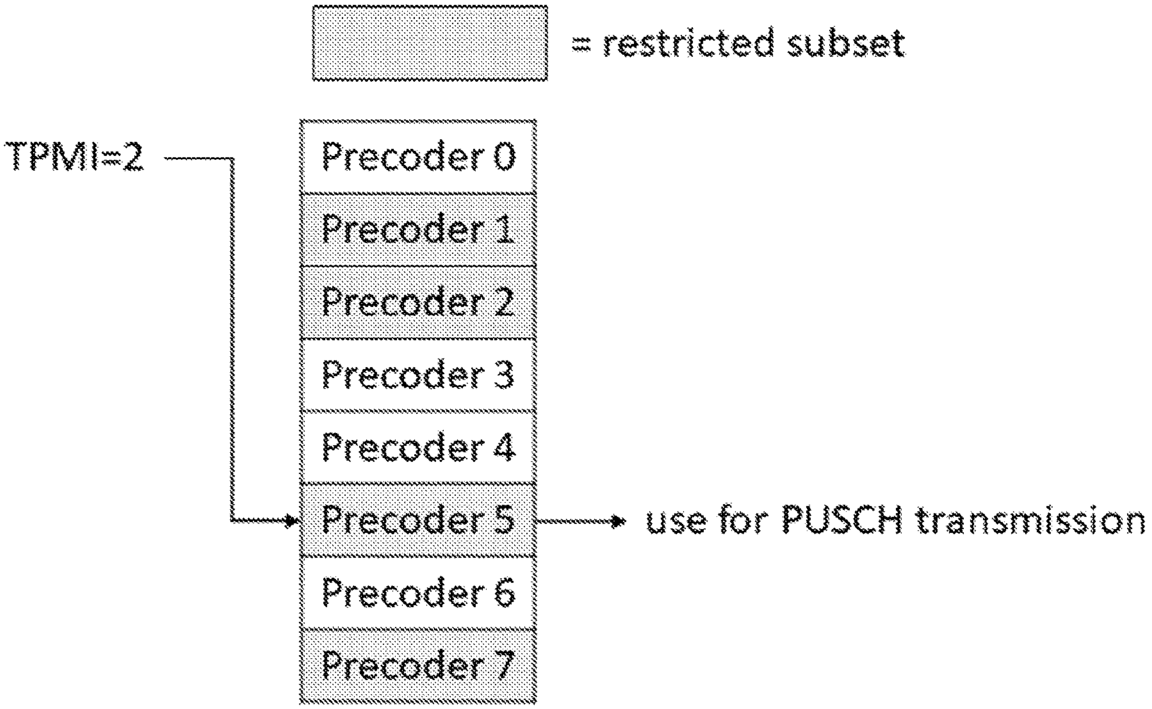
FIG. 3 illustrates an example of a subset of precoders in a set of precoders.

In one example, the UE can receive the TPMI in DCI (step 102). Then, the UE maps the TPMI into one precoder, out of a restricted set (or subset) of precoders. The selected precoder is used for PUSCH transmission. For example, FIG. 3 illustrates the UE selecting a precoder from a restricted set of precoders, based on the received TPMI. As illustrated, there are 8 possible precoders (precoder 0 to precoder 7); the restricted set comprises 4 precoders (precoder 1, precoder 2, precoder 5 and precoder 7), and TPMI-i corresponds to the ith precoder within the restricted subset. The gNB can determine the restricted set/subset of 4 precoders out of the set of 8 precoders, based on, for example, UE antenna configuration and other criteria as explained hereinbelow. When the UE receives the TPMI as TPMI=2, which is associated with the third precoder in the restricted set, i.e. precoder 5, the UE selects the precoder 5 and uses it for PUSCH transmissions. Here, numbered from 0-7, but only 4 precoders belong to the restricted subset In one example, the restricted subset can be determined by the properties of the UE antenna configuration, signaled to the NW as part of the UE capability reporting. The relation between the UE capability reporting and the restricted subset could be specified by the standard. The UE may signal the properties of its antenna configuration using legacy capability reporting, i.e., by reporting 'fullyAndPartialAndNonCoherent', 'partialAndNonCoherent' or 'nonCoherent'. Alternatively, a new capability reporting may be introduced to provide information about the UE antenna configuration, e.g., by reporting how many antenna port groups it supports, and/or whether the antenna ports in one group are coherent.

Figure 4:
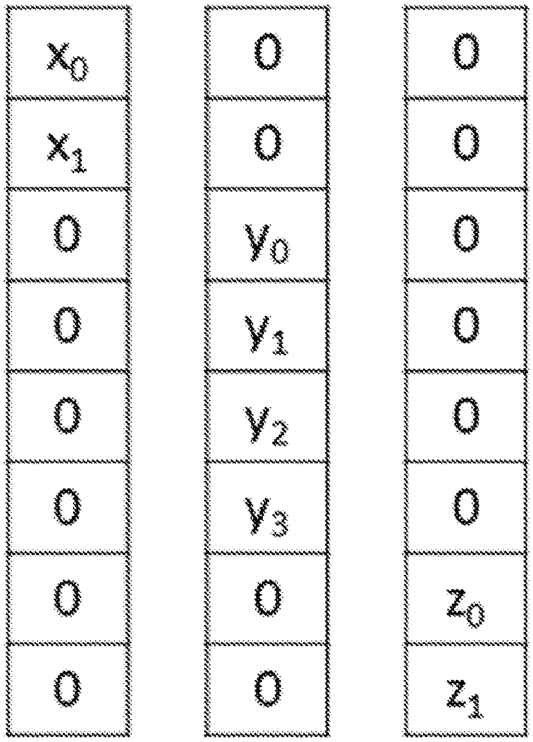
FIG. 4 illustrates an example of a subset of precoders when groups of antenna elements are coherent.

In another example, only precoders that contain non-zero coefficients for all the antenna elements that are mutually coherent, and coefficients of zero for the remaining, are part of the restricted subset. This is illustrated in FIG. 4. Indeed, FIG. 4 shows an illustration of a restricted subset when groups of antenna elements are coherent. Each row corresponds to one antenna element. Antenna elements 0 and 1 are mutually coherent, antenna elements 2, 3, 4 and 5 are mutually coherent and antenna elements 6 and 7 are mutually coherent. $x_i$, $y_i$, and $z_i$ are all non-zero.

As a specific example of FIG. 4, we consider precoder candidates for the case where the number of transmit antennas is $N_{TX}$=8 and where antennas (or antenna elements) 0, 1, 4, and 5 are coherent, and antennas (or antenna elements) 2, 3, 6, and 7 are coherent. In other words, there are $N_g$=2 groups of coherent transmit ports, with 4 ports in each group. In Table 4, we show an example of precoder candidates for the case when the maximum number of layers (i.e., higher-layer parameter maxRank) is $L_{max}$=1. Note that, within each group of coherent antennas, the possible precoding weights correspond to the set of fully-connected (or fully-coherent) precoders for 4 Tx and 1 layer. Hence, within each group of coherent antennas, (a subset of) legacy UL precoders are supported. An example of the corresponding TPMI field in DCI is shown in Table 5. Note that, in this example, the DCI overhead is 5 bits, which is the same as the DCI field for 4 Tx and 1 layer in legacy NR.

Table 4 illustrates the case for precoding matrix, W, for single-layer transmission using 8 antenna ports when the number of antenna port groups is $N_g$=2. Here, for each entry, rows 0-3 correspond to the precoding weights used over a first polarization and rows 4-7 correspond to the precoding weights used over a second polarization. Furthermore, rows 0, 1, 4, 5 belong to a first group and rows 2, 3, 6, 7 to a second group.

TABLE 4

| TPMI index | W (ordered from left to right in increasing order of TPMI index) | | | | | | | |
|---|---|---|---|---|---|---|---|---|
| 0-7 | $\frac{1}{4}\begin{bmatrix}1\\1\\0\\0\\1\\1\\0\\0\end{bmatrix}$ | $\frac{1}{4}\begin{bmatrix}1\\1\\0\\0\\j\\j\\0\\0\end{bmatrix}$ | $\frac{1}{4}\begin{bmatrix}1\\1\\0\\0\\-1\\-1\\0\\0\end{bmatrix}$ | $\frac{1}{4}\begin{bmatrix}1\\1\\0\\0\\-j\\-j\\0\\0\end{bmatrix}$ | $\frac{1}{4}\begin{bmatrix}1\\j\\0\\0\\1\\j\\0\\0\end{bmatrix}$ | $\frac{1}{4}\begin{bmatrix}1\\j\\0\\0\\j\\-1\\0\\0\end{bmatrix}$ | $\frac{1}{4}\begin{bmatrix}1\\j\\0\\0\\-1\\-j\\0\\0\end{bmatrix}$ | $\frac{1}{4}\begin{bmatrix}1\\j\\0\\0\\-j\\1\\0\\0\end{bmatrix}$ |
| 8-15 | $\frac{1}{4}\begin{bmatrix}1\\-1\\0\\0\\1\\-1\\0\\0\end{bmatrix}$ | $\frac{1}{4}\begin{bmatrix}1\\-1\\0\\0\\j\\-j\\0\\0\end{bmatrix}$ | $\frac{1}{4}\begin{bmatrix}1\\-1\\0\\0\\-1\\1\\0\\0\end{bmatrix}$ | $\frac{1}{4}\begin{bmatrix}1\\-1\\0\\0\\-j\\j\\0\\0\end{bmatrix}$ | $\frac{1}{4}\begin{bmatrix}1\\-j\\0\\0\\1\\-j\\0\\0\end{bmatrix}$ | $\frac{1}{4}\begin{bmatrix}1\\-j\\0\\0\\j\\1\\0\\0\end{bmatrix}$ | $\frac{1}{4}\begin{bmatrix}1\\-j\\0\\0\\-1\\j\\0\\0\end{bmatrix}$ | $\frac{1}{4}\begin{bmatrix}1\\-j\\0\\0\\-j\\-1\\0\\0\end{bmatrix}$ |
| 16-23 | $\frac{1}{4}\begin{bmatrix}0\\0\\1\\1\\0\\0\\1\\1\end{bmatrix}$ | $\frac{1}{4}\begin{bmatrix}0\\0\\1\\1\\0\\0\\j\\j\end{bmatrix}$ | $\frac{1}{4}\begin{bmatrix}0\\0\\1\\1\\0\\0\\-1\\-1\end{bmatrix}$ | $\frac{1}{4}\begin{bmatrix}0\\0\\1\\1\\0\\0\\-j\\-j\end{bmatrix}$ | $\frac{1}{4}\begin{bmatrix}0\\0\\1\\j\\0\\0\\1\\j\end{bmatrix}$ | $\frac{1}{4}\begin{bmatrix}0\\0\\1\\j\\0\\0\\j\\-1\end{bmatrix}$ | $\frac{1}{4}\begin{bmatrix}0\\0\\1\\j\\0\\0\\-1\\-j\end{bmatrix}$ | $\frac{1}{4}\begin{bmatrix}0\\0\\1\\j\\0\\0\\-j\\1\end{bmatrix}$ |
| 24-31 | $\frac{1}{4}\begin{bmatrix}0\\0\\1\\-1\\0\\0\\1\\-1\end{bmatrix}$ | $\frac{1}{4}\begin{bmatrix}0\\0\\1\\-1\\0\\0\\j\\-j\end{bmatrix}$ | $\frac{1}{4}\begin{bmatrix}0\\0\\1\\-1\\0\\0\\-1\\1\end{bmatrix}$ | $\frac{1}{4}\begin{bmatrix}0\\0\\1\\-1\\0\\0\\-j\\j\end{bmatrix}$ | $\frac{1}{4}\begin{bmatrix}0\\0\\1\\-j\\0\\0\\1\\-j\end{bmatrix}$ | $\frac{1}{4}\begin{bmatrix}0\\0\\1\\-j\\0\\0\\j\\1\end{bmatrix}$ | $\frac{1}{4}\begin{bmatrix}0\\0\\1\\-j\\0\\0\\-1\\j\end{bmatrix}$ | $\frac{1}{4}\begin{bmatrix}0\\0\\1\\-j\\0\\0\\-j\\1\end{bmatrix}$ |

Table 5 shows an example of precoding information and number of layers, for 8 antenna ports, if maxRank=1 and $N_g$=2.

TABLE 5

| Bit field mapped to index | $N_g = 2$ |
|---|---|
| 0 | 1 layer: TPMI = 0 |
| 1 | 1 layer: TPMI = 1 |
| . . . | . . . |
| 30 | 1 layer: TPMI = 30 |
| 31 | 1 layer: TPMI = 31 |

In Table 6, we show in another example a list of precoder candidates for the case $N_{TX}$=8, $N_g$=4, and when the maximum number of layers (i.e., the higher-layer parameter maxRank) is $L_{max}$=1. Note that, within each group, the possible precoding weights correspond to the set of fully-connected (fully coherent) precoders for 2 Tx and 1 layer. Hence, within each group, (a subset of) legacy UL precoders are supported. An example of the corresponding TPMI field in DCI is shown in Table 10. Note that, in this example, the DCI overhead is 4 bits, which is only 1 bit more compared to the DCI field for 2 Tx and 1 layer in legacy NR.

TABLE 6 precoding matrix, W, for single-layer transmission using 8 antenna ports when $N_g = 4$. Here, for each entry, rows 0-3 correspond to the precoding weights used over a first polarization and rows 4-7 correspond to the precoding weights used over a second polarization. Furthermore, rows 0, 4 belongs to a first group, rows 1, 5 to a second group, rows 2, 6 to a third group, and rows 3, 7 to a fourth group.

| TPMI index | W (ordered from left to right in increasing order of TPMI index) | | | | | | | |
|---|---|---|---|---|---|---|---|---|
| 0-7 | $\frac{1}{4}\begin{bmatrix}1\\0\\0\\0\\1\\0\\0\\0\end{bmatrix}$ | $\frac{1}{4}\begin{bmatrix}1\\0\\0\\0\\j\\0\\0\\0\end{bmatrix}$ | $\frac{1}{4}\begin{bmatrix}1\\0\\0\\0\\-1\\0\\0\\0\end{bmatrix}$ | $\frac{1}{4}\begin{bmatrix}1\\0\\0\\0\\-j\\0\\0\\0\end{bmatrix}$ | $\frac{1}{4}\begin{bmatrix}0\\1\\0\\0\\0\\1\\0\\0\end{bmatrix}$ | $\frac{1}{4}\begin{bmatrix}0\\1\\0\\0\\0\\j\\0\\0\end{bmatrix}$ | $\frac{1}{4}\begin{bmatrix}0\\1\\0\\0\\0\\-1\\0\\0\end{bmatrix}$ | $\frac{1}{4}\begin{bmatrix}0\\1\\0\\0\\0\\-j\\0\\0\end{bmatrix}$ |
| 8-15 | $\frac{1}{4}\begin{bmatrix}0\\0\\1\\0\\0\\0\\1\\0\end{bmatrix}$ | $\frac{1}{4}\begin{bmatrix}0\\0\\1\\0\\0\\0\\j\\0\end{bmatrix}$ | $\frac{1}{4}\begin{bmatrix}0\\0\\1\\0\\0\\0\\-1\\0\end{bmatrix}$ | $\frac{1}{4}\begin{bmatrix}0\\0\\1\\0\\0\\0\\-j\\0\end{bmatrix}$ | $\frac{1}{4}\begin{bmatrix}0\\0\\0\\1\\0\\0\\0\\1\end{bmatrix}$ | $\frac{1}{4}\begin{bmatrix}0\\0\\0\\1\\0\\0\\0\\j\end{bmatrix}$ | $\frac{1}{4}\begin{bmatrix}0\\0\\0\\1\\0\\0\\0\\-1\end{bmatrix}$ | $\frac{1}{4}\begin{bmatrix}0\\0\\0\\1\\0\\0\\0\\-j\end{bmatrix}$ |

Table 7 illustrates an example of precoding information and number of layers, for 8 antenna ports, if maxRank=1 and $N_g$=4.

TABLE 7

| Bit field mapped to index | $N_g = 2$ |
|---|---|
| 0 | 1 layer: TPMI = 0 |
| 1 | 1 layer: TPMI = 1 |
| . . . | . . . |
| 14 | 1 layer: TPMI = 14 |
| 15 | 1 layer: TPMI = 15 |

In one example, when the UE reports a plurality of number of antenna port groups, the TPMI field in the DCI includes TPMI candidates for all reported number of antenna port groups. For example, if an 8 Tx UE reports $N_g$=[2,4], with the maximum number of layers being one. The TPMI field may contain entries from both Table 4 and Table 7. One example of such a TPMI field is shown in Table 9. In this example, the size of the TPMI field is $\lceil \log_2(32+16) \rceil$=6 bits.

Table 8 illustrates an example of precoding information and number of layers, for 8 antenna ports, if maxRank=1 and $N_g$=[2,4].

TABLE 8

| Bit field mapped to index | $N_g$ = [2, 4] |
|---|---|
| 0 | 1 layer: TPMI = 0 of Error! Reference source not found. Error! Reference source not found. |
| 1 | 1 layer: TPMI = 1 of Error! Reference source not found. Error! Reference source not found. |
| . . . | . . . |

TABLE 8-continued

| Bit field mapped to index | $N_g$ = [2, 4] |
|---|---|
| 30 | 1 layer: TPMI = 30 of Error! Reference source not found. Error! Reference source not found. |
| 31 | 1 layer: TPMI = 31 of Error! Reference source not found. Error! Reference source not found. |
| 32 | 1 layer: TPMI = 0 of Error! Reference source not found. Error! Reference source not found. |
| 33 | 1 layer: TPMI = 1 of Error! Reference source not found. |
| . . . | . . . |
| 46 | 1 layer: TPMI = 14 of Error! Reference source not found. Error! Reference source not found. |
| 47 | 1 layer: TPMI = 15 of Error! Reference source not found. |
| 48-61 | reserved |

In another example, the NW explicitly configures the UE with the restricted subset. For example, the NW may configure the UE with a set of M indices, {idx1, idx2, . . . , idxM}. Each index is used to indicate one of the N available precoders, where N>M. The TPMI value range is 1, . . . , M. If TPMI=j, the UE would select the precoder corresponding to idxj.

The subset can be explicitly configured using RRC or using MAC CE. For example, the UE reports $N_g \in \{2,4\}$ groups, but the gNB configures (and signals to the UE) only $N_g$=2 groups to further reduce the DCI overhead.

In one example, a new group indicator (GI) field is introduced in the DCI. The GI field would indicate which precoder subset the UE should use.

In other example, the above examples can be combined. For example, RRC can be used to configure a first subset, and a MAC CE may be used to select/indicate a second subset out of the first subset.

In Table 9, we show an example of the TPMI field in the DCI for the case $N_{TX}$=8, $N_g$=2, and when the maximum number of layers (i.e., the higher-layer parameter maxRank) is $L_{max}$=1. Note that, for such a UE, the number of transmit ports per group is $N_{TX}/N_g$=8/2=4. Here, the TPMI values maps to TPMI indices of the existing Table 6.3.1.5-3 of 3GPP TS 38.211 (as reproduced in Table 2), which is valid for a 4 Tx UE. Specifically, the 16 TPMI indices in Table 10 correspond to the set of fully-coherent precoders in Table 2 (recall that transmit ports within a group can be assumed to be coherent, whereas antenna ports in different groups can be assumed to be non-coherent). To indicate which of the 2 antenna-port groups the signaled TPMI should be mapped to, a different 1-bit DCI field (e.g., a new GI field) is used. If the GI field takes a value of 0, the gNB indicates that the TPMI should be mapped to the transmit ports in the first group (e.g., transmit ports 0-3) and if the GI field takes a value of 1, the gNB indicates that the TPMI should be mapped to the transmit ports in the second group (e.g., transmit ports 4-7).

TABLE 9 example of precoding information and number of layers, for 8 antenna ports, if maxRank = 1 and $N_g$ = 2. Here, the TPMI values maps to TPMI indices of existing Table 6.3.1.5-3 of 3GPP TS 38.211 (i.e. Table 2)

| Bit field mapped to index | $N_g$ = 2 |
|---|---|
| 0 | 1 layer: TPMI = 12 |
| 1 | 1 layer: TPMI = 13 |
| . . . | . . . |
| 14 | 1 layer: TPMI = 26 |
| 15 | 1 layer: TPMI = 27 |

Figure 5:
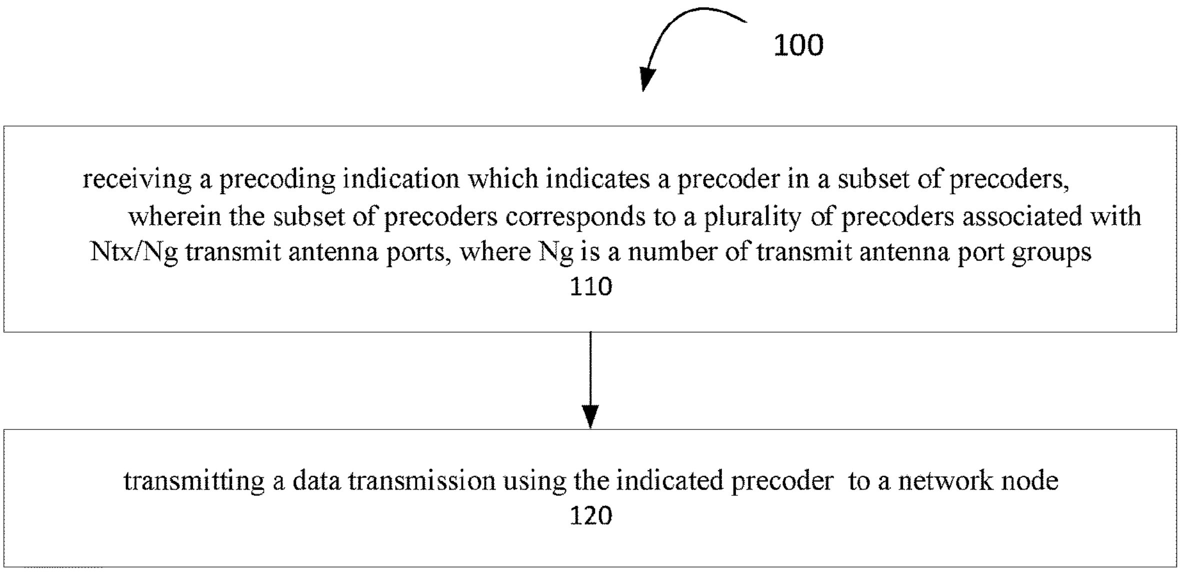
FIG. 5 illustrates an example of a flow chart of a method in a UE, according to an embodiment.

Now, turning to FIG. 5, a flow chart of a method 100 for performing (UL) transmissions will be described. The method can be performed in a UE, such as UE 712A of FIG. 7, which is configured with a number of transmit antennas ($N_{TX}$). Method 100 comprises:

Step 110: receiving a precoding indication which indicates a precoder in a subset of precoders, wherein the subset of precoders corresponds to a plurality of precoders associated with $N_{TX}/N_g$ transmit antenna ports, where $N_g$ is a number of transmit antenna port groups; and Step 120: transmitting a data transmission using the indicated precoder to a network node.

In some examples, the UE may receive an indication of a number of transmission layers (e.g. rank). In some examples, the precoding indication can indicate a precoder in a subset of precoders for each transmission layer. In some examples, the UE may further receive an indication of the subset of precoders. In some examples, the indication of the subset of precoders can be signaled via one of a RRC configuration, a MAC CE, or DCI. In some examples, the precoding indication can be a TPMI. As a note, the TPMI can point to precoders for different ranks. In some examples, the UE can further receive an indication of a mapping between TPMIs and the precoders in the subset. In some examples, the DCI may comprise a new field to indicate the subset of precoders to use. In some examples, the subset of precoders can be determined based on an antenna configuration of the UE. In some examples, the antenna configuration may comprise one or more of the number of transmit antenna port groups and coherency of the transmit antenna ports. In some examples, the precoding indication may comprise a configuration of a set of indices, each index indicating an available precoder in the subset and each index being mapped to a TPMI. In some examples, the number of transmit antenna ports is 8 and the number of transmit antenna port groups is 4 and the subset of precoders corresponds to a plurality of precoders associated with 2 transmit antenna ports. In some examples, there are 4 subsets of precoders associated with the 4 transmit antenna port groups, and each transmit antenna group comprises 2 transmit antenna ports. In some examples, each of the 4 subsets of precoders are fully coherent precoders.

In some examples, the number of transmit antenna ports is 8 and the number of transmit antenna port groups is 2 and the subset of precoders corresponds to a plurality of precoders associated with 4 transmit antenna ports. In this case, there are 2 subsets of precoders associated with the 2 transmit antenna port groups, and each transmit antenna group comprises 4 transmit antenna ports. In some examples, each of the 2 subsets of precoders are fully coherent precoders.

In some examples, only precoders that contain non-zero coefficients for transmit antenna ports that are mutually coherent, and coefficients of zero for the remaining transmit antenna ports, are part of the subset. Also, as a note, all the 8 or NIX transmit antenna ports can be used but each layer is mapped to only a subset of the transmit antenna ports.

Figure 6:
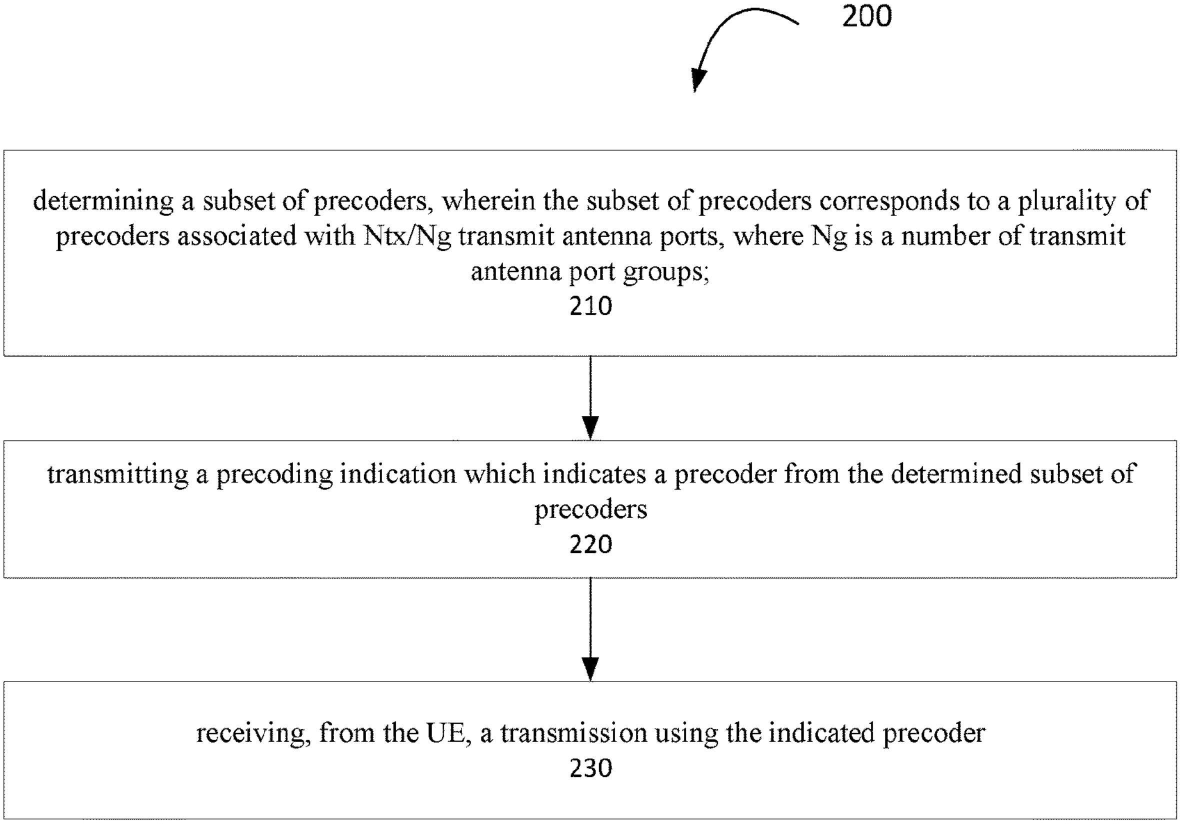
FIG. 6 illustrates an example of a flow chart of a method in a network node, according to an embodiment.

FIG. 6 illustrates a flow chart of a method 200 for UL transmissions between a UE and a network node. The UE is configured with a number of transmit antennas ($N_{TX}$), for example. Method 200 can be performed by a network node (e.g. gNB 710A of FIG. 7) and comprises:

Step 210: determining a subset of precoders, wherein the subset of precoders corresponds to a plurality of precoders associated with $N_{TX}/N_g$ transmit antenna ports, where $N_g$ is a number of transmit antenna port groups;

Step 220: transmitting a precoding indication which indicates a precoder from the determined subset of precoders; and Step 230: receiving, from the UE, a transmission using the indicated precoder.

In some examples, the network node may transmit an indication of a number of transmission layers (or rank) to the UE. In some examples, the precoding indication can indicate a precoder in a subset of precoders for each transmission layer. In some examples, the network node may transmit an indication of the subset of precoders to the UE. In some examples, the indication of the subset of precoders is signaled via one of a RRC configuration, a MAC CE, or DCI. In some examples, the precoding indication is a TPMI. In some examples, the DCI may comprise a new field to indicate the subset of precoders to use. In some examples, the subset of precoders can be determined based on an antenna configuration of the UE. In some examples, the antenna configuration may comprise one or more of the number of transmit antenna port groups and coherency of the transmit antenna ports. In some examples, the precoding indication may comprise a configuration of a set of indices, each index indicating an available precoder in the subset and each index being mapped to a TPMI. In some examples, the number of transmit antenna ports is 8 and the number of transmit antenna port groups is 4 and the subset of precoders corresponds to a plurality of precoders associated with 2 transmit antenna ports. In this case, there are 4 subsets of precoders associated with the 4 transmit antenna port groups, and each transmit antenna group comprises 2 transmit antenna ports. In some examples, each of the 4 subsets of precoders are fully coherent precoders.

In some examples, the number of transmit antenna ports is 8 and the number of transmit antenna port groups is 2 and the subset of precoders corresponds to a plurality of precoders associated with 4 transmit antenna ports. In some examples, there are 2 subsets of precoders associated with the 2 transmit antenna port groups, and each transmit antenna group comprises 4 transmit antenna ports. In some examples, each of the 2 subsets of precoders are fully coherent precoders.

In some examples, only precoders that contain non-zero coefficients for transmit antenna ports that are mutually coherent and coefficients of zero for the remaining transmit antenna ports, are part of the subset.

Figure 7:
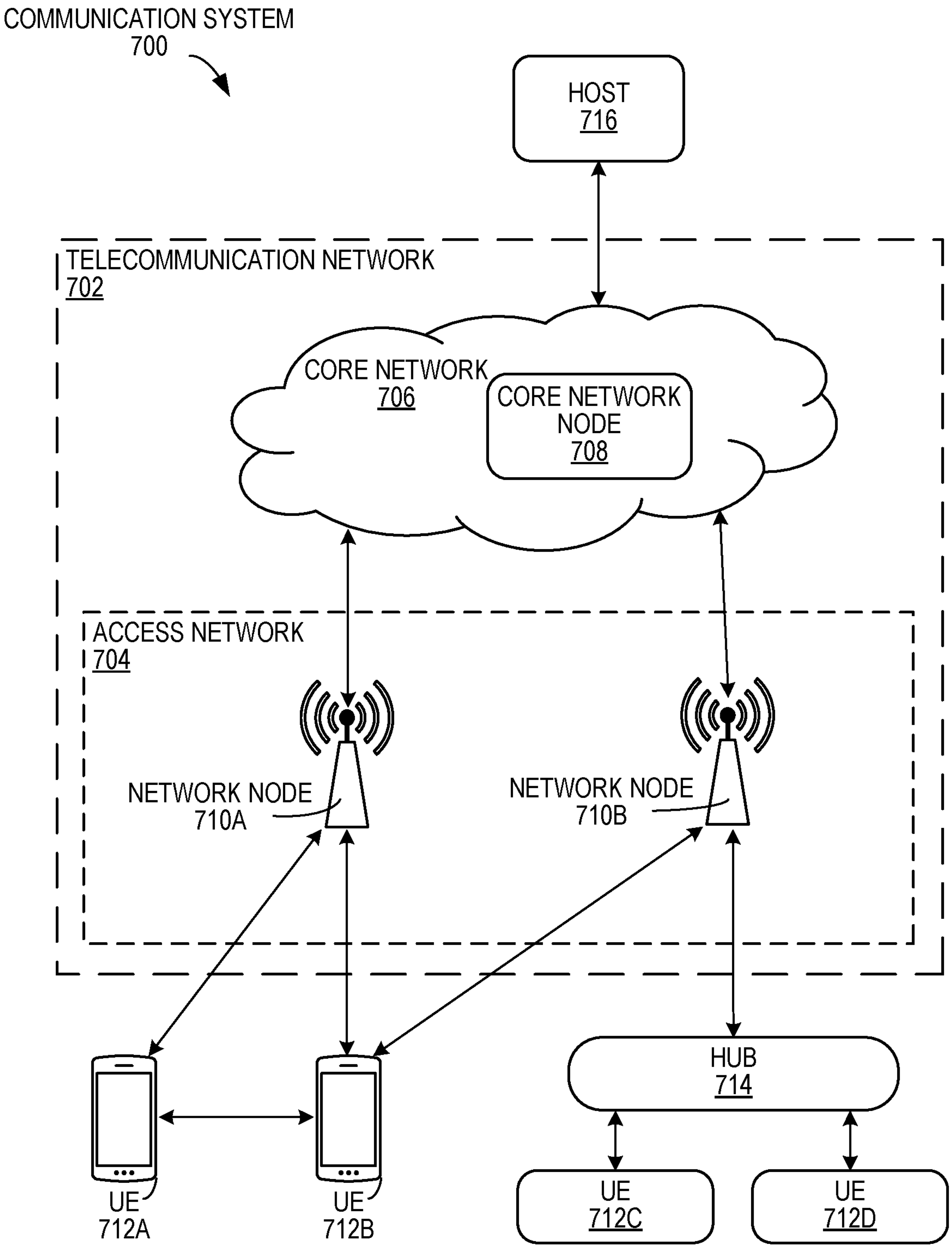
FIG. 7 shows an example of a communication system, according to an embodiment.

FIG. 7 shows an example of a communication system 700 in accordance with some embodiments.

In the example, the communication system 700 includes a telecommunication network 702 that includes an access network 704, such as a radio access network (RAN), and a core network 706, which includes one or more core network nodes 708. The access network 704 includes one or more access network nodes, such as network nodes 710*a* and 710*b* (one or more of which may be generally referred to as network nodes 710), or any other similar 3GPP access node or non-3GPP access point. The network nodes 710 facilitate direct or indirect connection of UE, such as by connecting UEs 712*a*, 712*b*, 712*c*, and 712*d* (one or more of which may be generally referred to as UEs 712) to the core network 706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 700 may include any number of wired or wireless networks, network nodes, UEs, and/or any other components or systems that may facilitate or participate in the communication of data and/or signals whether via wired or wireless connections. The communication system 700 may include and/or interface with any type of communication, telecommunication, data, cellular, radio network, and/or other similar type of system.

The UEs 712 may be any of a wide variety of communication devices, including wireless devices arranged, configured, and/or operable to communicate wirelessly with the network nodes 710 and other communication devices. Similarly, the network nodes 710 are arranged, capable, configured, and/or operable to communicate directly or indirectly with the UEs 712 and/or with other network nodes or equipment in the telecommunication network 702 to enable and/or provide network access, such as wireless network access, and/or to perform other functions, such as administration in the telecommunication network 702.

In the depicted example, the core network 706 connects the network nodes 710 to one or more hosts, such as host 716. These connections may be direct or indirect via one or more intermediary networks or devices. In other examples, network nodes may be directly coupled to hosts. The core network 706 includes one more core network nodes (e.g., core network node 708) that are structured with hardware and software components. Features of these components may be substantially similar to those described with respect to the UEs, network nodes, and/or hosts, such that the descriptions thereof are generally applicable to the corresponding components of the core network node 708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 716 may be under the ownership or control of a service provider other than an operator or provider of the access network 704 and/or the telecommunication network 702, and may be operated by the service provider or on behalf of the service provider. The host 716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 700 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); LTE, and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 702 is a cellular network that implements 3GPP standardized features. Accordingly, the telecommunications network 702 may support network slicing to provide different logical networks to different devices that are connected to the telecommunication network 702. For example, the telecommunications network 702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 712 are configured to transmit and/or receive information without direct human interaction. For instance, a UE may be designed to transmit information to the access network 704 on a predetermined schedule, when triggered by an internal or external event, or in response to requests from the access network 704. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 714 communicates with the access network 704 to facilitate indirect communication between one or more UEs (e.g., UE 712*c* and/or 712*d*) and network nodes (e.g., network node 710*b*). In some examples, the hub 714 may be a controller, router, content source and analytics, or any of the other communication devices described herein regarding UEs. For example, the hub 714 may be a broadband router enabling access to the core network 706 for the UEs. As another example, the hub 714 may be a controller that sends commands or instructions to one or more actuators in the UEs. Commands or instructions may be received from the UEs, network nodes 710, or by executable code, script, process, or other instructions in the hub 714. As another example, the hub 714 may be a data collector that acts as temporary storage for UE data and, in some embodiments, may perform analysis or other processing of the data. As another example, the hub 714 may be a content source. For example, for a UE that is a VR headset, display, loudspeaker or other media delivery device, the hub 714 may retrieve VR assets, video, audio, or other media or data related to sensory information via a network node, which the hub 714 then provides to the UE either directly, after performing local processing, and/or after adding additional local content. In still another example, the hub 714 acts as a proxy server or orchestrator for the UEs, in particular in if one or more of the UEs are low energy IoT devices.

The hub 714 may have a constant/persistent or intermittent connection to the network node 710*b*. The hub 714 may also allow for a different communication scheme and/or schedule between the hub 714 and UEs (e.g., UE 712*c* and/or 712*d*), and between the hub 714 and the core network 706. In other examples, the hub 714 is connected to the core network 706 and/or one or more UEs via a wired connection. Moreover, the hub 714 may be configured to connect to an M2M service provider over the access network 704 and/or to another UE over a direct connection. In some scenarios, UEs may establish a wireless connection with the network nodes 710 while still connected via the hub 714 via a wired or wireless connection. In some embodiments, the hub 714 may be a dedicated hub—that is, a hub whose primary function is to route communications to/from the UEs from/to the network node 710*b*. In other embodiments, the hub 714 may be a non-dedicated hub—that is, a device which is capable of operating to route communications between the UEs and network node 710*b*, but which is additionally capable of operating as a communication start and/or end point for certain data channels.

Figure 8:
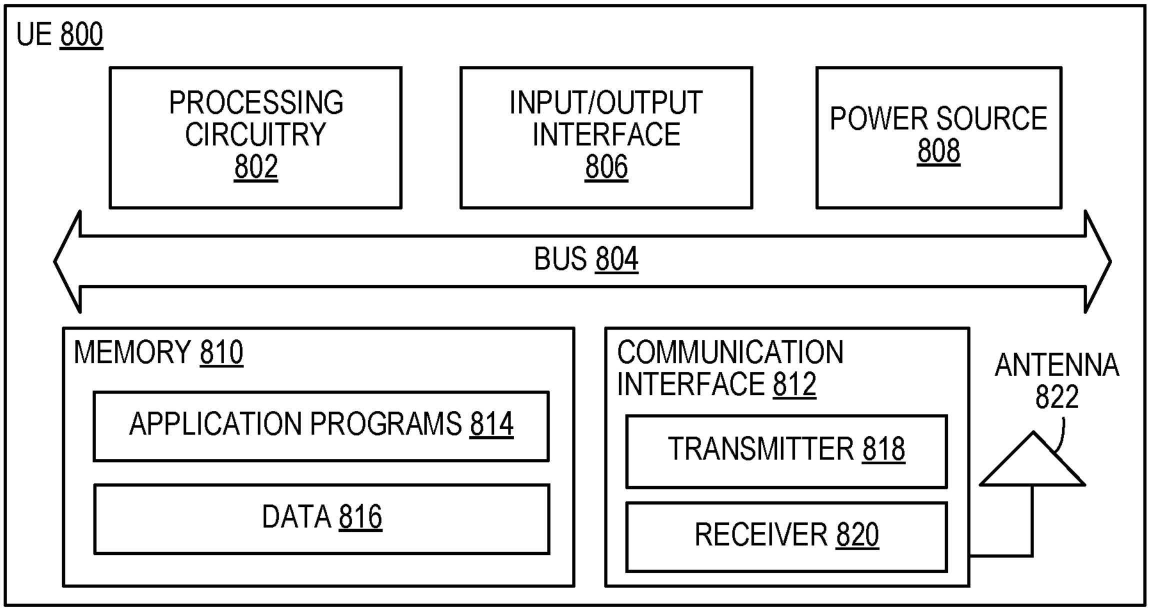
FIG. 8 shows a schematic diagram of a UE, according to an embodiment.

FIG. 8 shows a UE 800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 800 includes processing circuitry 802 that is operatively coupled via a bus 804 to an input/output interface 806, a power source 808, a memory 810, a communication interface 812, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry 802 is configured to process instructions and data and may be configured to implement any sequential state machine operative to execute instructions stored as machine-readable computer programs in the memory 810. The processing circuitry 802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 802 may include multiple central processing units (CPUs). Also, the processing circuitry 802 can be configured to perform any of the steps of method 100 of FIG. 5.

In the example, the input/output interface 806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 808 is structured as a battery or battery pack. Other types of power sources, such as an external power source (e.g., an electricity outlet), photovoltaic device, or power cell, may be used. The power source 808 may further include power circuitry for delivering power from the power source 808 itself, and/or an external power source, to the various parts of the UE 800 via input circuitry or an interface such as an electrical power cable. Delivering power may be, for example, for charging of the power source 808. Power circuitry may perform any formatting, converting, or other modification to the power from the power source 808 to make the power suitable for the respective components of the UE 800 to which power is supplied.

The memory 810 may be or be configured to include memory such as random access memory (RAM), read-only memory (ROM), programmable ROM (PROM), erasable PROM (EPROM), electrically EPROM (EEPROM), magnetic disks, optical disks, hard disks, removable cartridges, flash drives, and so forth. In one example, the memory 810 includes one or more application programs 814, such as an operating system, web browser application, a widget, gadget engine, or other application, and corresponding data 816. The memory 810 may store, for use by the UE 800, any of a variety of various operating systems or combinations of operating systems.

The memory 810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 810 may allow the UE 800 to access instructions, application programs and the like, stored on transitory or non-transitory memory media, to off-load data, or to upload data. An article of manufacture, such as one utilizing a communication system may be tangibly embodied as or in the memory 810, which may be or comprise a device-readable storage medium.

The processing circuitry 802 may be configured to communicate with an access network or other network using the communication interface 812. The communication interface 812 may comprise one or more communication subsystems and may include or be communicatively coupled to an antenna 822. The communication interface 812 may include one or more transceivers used to communicate, such as by communicating with one or more remote transceivers of another device capable of wireless communication (e.g., another UE or a network node in an access network). Each transceiver may include a transmitter 818 and/or a receiver 820 appropriate to provide network communications (e.g., optical, electrical, frequency allocations, and so forth). Moreover, the transmitter 818 and receiver 820 may be coupled to one or more antennas (e.g., antenna 822) and may share circuit components, software or firmware, or alternatively be implemented separately.

In the illustrated embodiment, communication functions of the communication interface 812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, NR, UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, any kind of medical device, like a heart rate monitor or a remote controlled surgical robot, etc., A UE in the form of an IoT device comprises circuitry and/or software in dependence of the intended application of the IoT device in addition to other components as described in relation to the UE 800 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
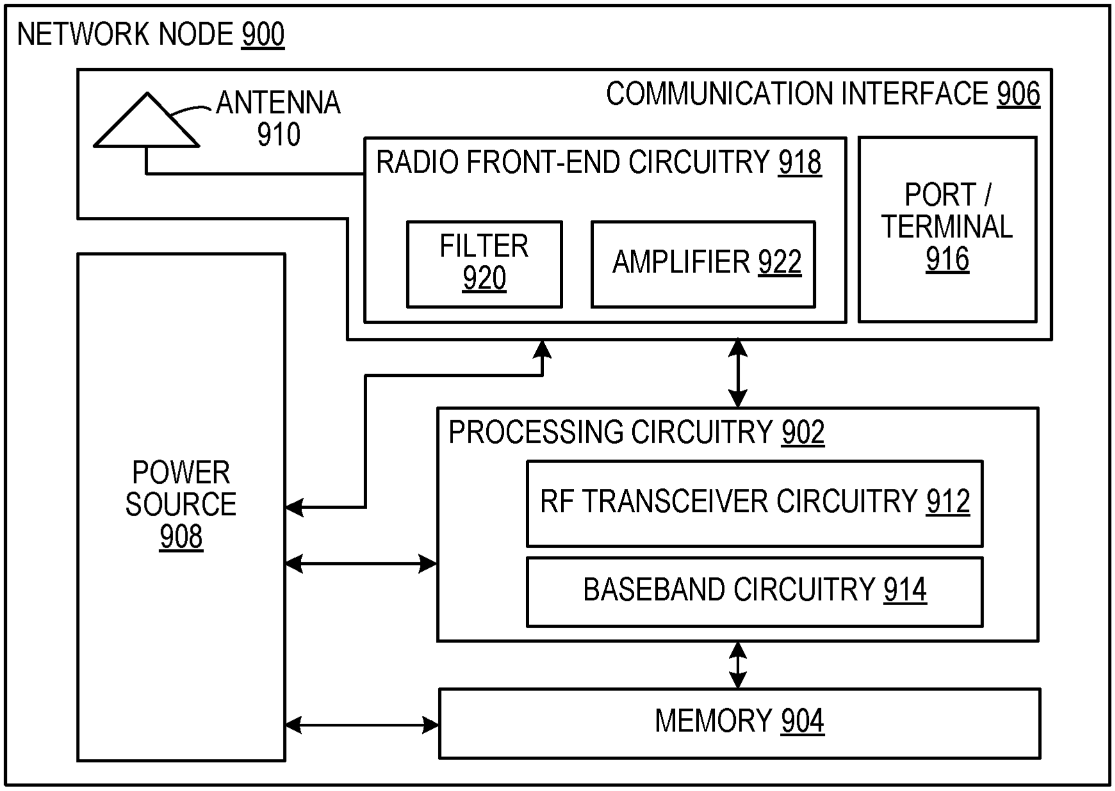
FIG. 9 shows a schematic diagram of a network node, according to an embodiment.

FIG. 9 shows a network node 900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs (NBs), evolved NBs (eNBs) and NR NBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 900 includes a processing circuitry 902, a memory 904, a communication interface 906, and a power source 908. The network node 900 may be composed of multiple physically separate components (e.g., a NB component and a RNC component, or a BTS component and a BSC component, etc.), which may each have their own respective components. In certain scenarios in which the network node 900 comprises multiple separate components (e.g., BTS and BSC components), one or more of the separate components may be shared among several network nodes. For example, a single RNC may control multiple NBs. In such a scenario, each unique NB and RNC pair, may in some instances be considered a single separate network node. In some embodiments, the network node 900 may be configured to support multiple radio access technologies (RATs). In such embodiments, some components may be duplicated (e.g., separate memory 904 for different RATs) and some components may be reused (e.g., a same antenna 910 may be shared by different RATs). The network node 900 may also include multiple sets of the various illustrated components for different wireless technologies integrated into network node 900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 900.

The processing circuitry 902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 900 components, such as the memory 904, to provide network node 900 functionality. For example, the processing circuitry 902 is configured to perform any actions/operations/blocks of method 200 of FIG. 6.

In some embodiments, the processing circuitry 902 includes a system on a chip (SOC). In some embodiments, the processing circuitry 902 includes one or more of radio frequency (RF) transceiver circuitry 912 and baseband processing circuitry 914. In some embodiments, the radio frequency (RF) transceiver circuitry 912 and the baseband processing circuitry 914 may be on separate chips (or sets of chips), boards, or units, such as radio units and digital units. In alternative embodiments, part or all of RF transceiver circuitry 912 and baseband processing circuitry 914 may be on the same chip or set of chips, boards, or units.

The memory 904 may comprise any form of volatile or non-volatile computer-readable memory including, without limitation, persistent storage, solid-state memory, remotely mounted memory, magnetic media, optical media, random access memory (RAM), ROM, mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 902. The memory 904 may store any suitable instructions, data, or information, including a computer program, software, an application including one or more of logic, rules, code, tables, and/or other instructions capable of being executed by the processing circuitry 902 and utilized by the network node 900. The memory 904 may be used to store any calculations made by the processing circuitry 902 and/or any data received via the communication interface 906. In some embodiments, the processing circuitry 902 and memory 904 is integrated.

The communication interface 906 is used in wired or wireless communication of signaling and/or data between a network node, access network, and/or UE. As illustrated, the communication interface 906 comprises port(s)/terminal(s) 916 to send and receive data, for example to and from a network over a wired connection. The communication interface 906 also includes radio front-end circuitry 918 that may be coupled to, or in certain embodiments a part of, the antenna 910. Radio front-end circuitry 918 comprises filters 920 and amplifiers 922. The radio front-end circuitry 918 may be connected to an antenna 910 and processing circuitry 902. The radio front-end circuitry may be configured to condition signals communicated between antenna 910 and processing circuitry 902. The radio front-end circuitry 918 may receive digital data that is to be sent out to other network nodes or UEs via a wireless connection. The radio front-end circuitry 918 may convert the digital data into a radio signal having the appropriate channel and bandwidth parameters using a combination of filters 920 and/or amplifiers 922. The radio signal may then be transmitted via the antenna 910. Similarly, when receiving data, the antenna 910 may collect radio signals which are then converted into digital data by the radio front-end circuitry 918. The digital data may be passed to the processing circuitry 902. In other embodiments, the communication interface may comprise different components and/or different combinations of components.

In certain alternative embodiments, the network node 900 does not include separate radio front-end circuitry 918, instead, the processing circuitry 902 includes radio front-end circuitry and is connected to the antenna 910. Similarly, in some embodiments, all or some of the RF transceiver circuitry 912 is part of the communication interface 906. In still other embodiments, the communication interface 906 includes one or more ports or terminals 916, the radio front-end circuitry 918, and the RF transceiver circuitry 912, as part of a radio unit (not shown), and the communication interface 906 communicates with the baseband processing circuitry 914, which is part of a digital unit (not shown).

The antenna 910 may include one or more antennas, or antenna arrays, configured to send and/or receive wireless signals. The antenna 910 may be coupled to the radio front-end circuitry 918 and may be any type of antenna capable of transmitting and receiving data and/or signals wirelessly. In certain embodiments, the antenna 910 is separate from the network node 900 and connectable to the network node 900 through an interface or port.

The antenna 910, communication interface 906, and/or the processing circuitry 902 may be configured to perform any receiving operations and/or certain obtaining operations described herein as being performed by the network node. Any information, data and/or signals may be received from a UE, another network node and/or any other network equipment. Similarly, the antenna 910, the communication interface 906, and/or the processing circuitry 902 may be configured to perform any transmitting operations described herein as being performed by the network node. Any information, data and/or signals may be transmitted to a UE, another network node and/or any other network equipment.

The power source 908 provides power to the various components of network node 900 in a form suitable for the respective components (e.g., at a voltage and current level needed for each respective component). The power source 908 may further comprise, or be coupled to, power management circuitry to supply the components of the network node 900 with power for performing the functionality described herein. For example, the network node 900 may be connectable to an external power source (e.g., the power grid, an electricity outlet) via an input circuitry or interface such as an electrical cable, whereby the external power source supplies power to power circuitry of the power source 908. As a further example, the power source 908 may comprise a source of power in the form of a battery or battery pack which is connected to, or integrated in, power circuitry. The battery may provide backup power should the external power source fail.

Embodiments of the network node 900 may include additional components beyond those shown in FIG. 9 for providing certain aspects of the network node's functionality, including any of the functionality described herein and/or any functionality necessary to support the subject matter described herein. For example, the network node 900 may include user interface equipment to allow input of information into the network node 900 and to allow output of information from the network node 900. This may allow a user to perform diagnostic, maintenance, repair, and other administrative functions for the network node 900.

Figure 10:
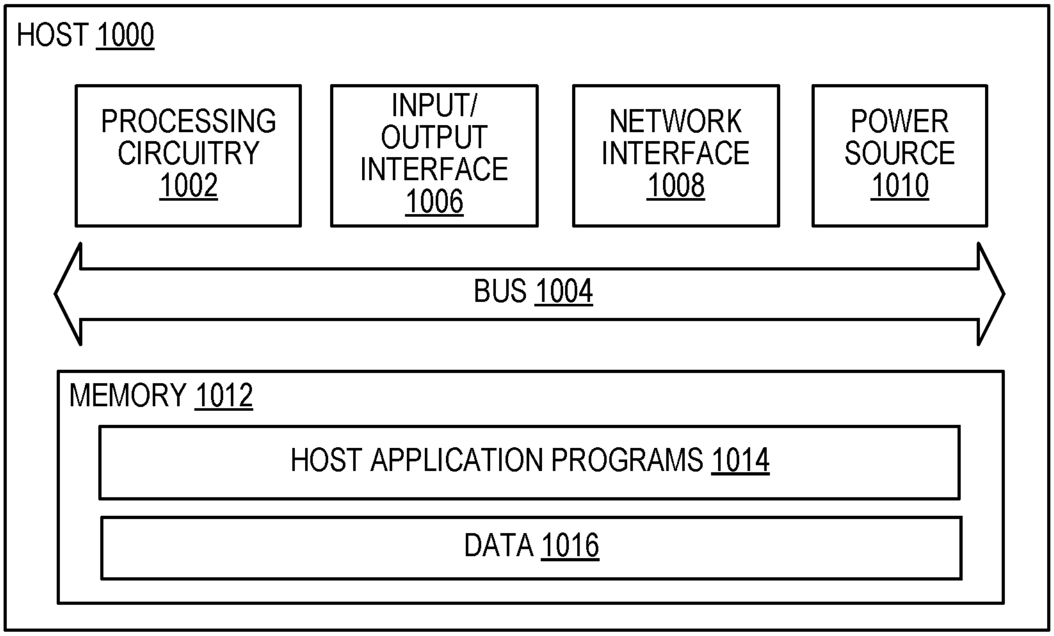
FIG. 10 illustrates a block diagram of a host.

FIG. 10 is a block diagram of a host 1000, which may be an embodiment of the host 716 of FIG. 7, in accordance with various aspects described herein. As used herein, the host 1000 may be or comprise various combinations hardware and/or software, including a standalone server, a blade server, a cloud-implemented server, a distributed server, a virtual machine, container, or processing resources in a server farm. The host 1000 may provide one or more services to one or more UEs.

The host 1000 includes processing circuitry 1002 that is operatively coupled via a bus 1004 to an input/output interface 1006, a network interface 1008, a power source 1010, and a memory 1012. Other components may be included in other embodiments. Features of these components may be substantially similar to those described with respect to the devices of previous figures, such as FIGS. 8 and 9, such that the descriptions thereof are generally applicable to the corresponding components of host 1000.

The memory 1012 may include one or more computer programs including one or more host application programs 1014 and data 1016, which may include user data, e.g., data generated by a UE for the host 1000 or data generated by the host 1000 for a UE. Embodiments of the host 1000 may utilize only a subset or all of the components shown. The host application programs 1014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1014 may also provide for user authentication and licensing checks and may periodically report health, routes, and content availability to a central node, such as a device in or on the edge of a core network. Accordingly, the host 1000 may select and/or indicate a different host for over-the-top services for a UE. The host application programs 1014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
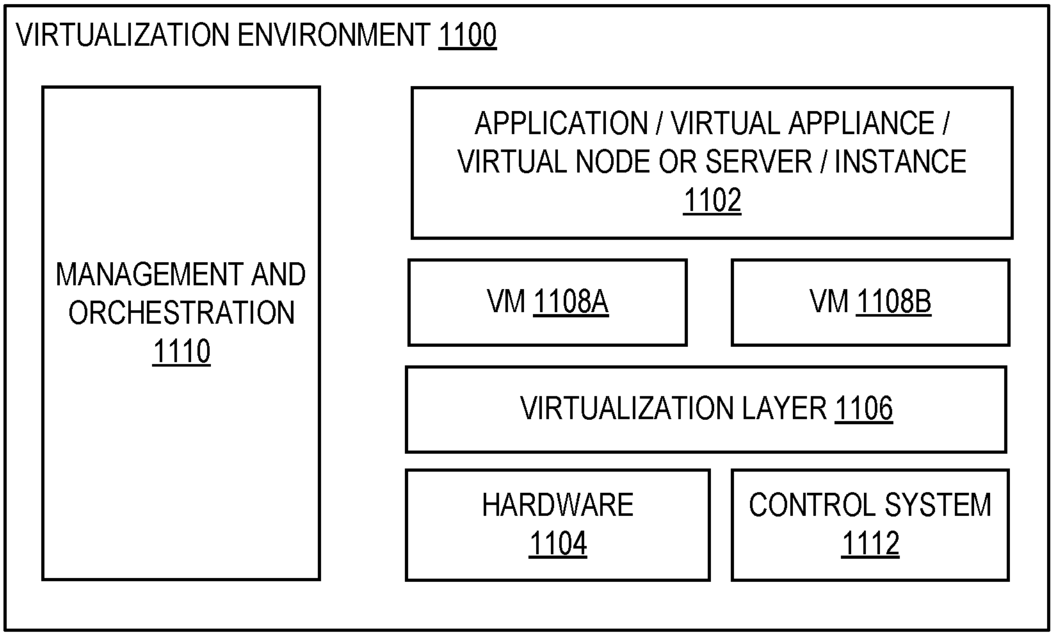
FIG. 11 illustrates a block diagram illustrating a virtualization environment.

FIG. 11 is a block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1100 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1102 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1104 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1106 (also referred to as hypervisors or virtual machine monitors (VMMs)), provide VMs **1108*a* and 1108*b* (one or more of which may be generally referred to as VMs 1108), and/or perform any of the functions, features and/or benefits described in relation with some embodiments described herein. The virtualization layer 1106 may present a virtual operating platform that appears like networking hardware to the VMs 1108**.

The VMs 1108 comprise virtual processing, virtual memory, virtual networking or interface and virtual storage, and may be run by a corresponding virtualization layer 1106. Different embodiments of the instance of a virtual appliance 1102 may be implemented on one or more of VMs 1108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1108 may be a software implementation of a physical machine that runs programs as if they were executing on a physical, non-virtualized machine. Each of the VMs 1108, and that part of hardware 1104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1108 on top of the hardware 1104 and corresponds to the application 1102.

Hardware 1104 may be implemented in a standalone network node with generic or specific components. Hardware 1104 may implement some functions via virtualization. Alternatively, hardware 1104 may be part of a larger cluster of hardware (e.g. such as in a data center or CPE) where many hardware nodes work together and are managed via management and orchestration 1110, which, among others, oversees lifecycle management of applications 1102. In some embodiments, hardware 1104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1112 which may alternatively be used for communication between hardware nodes and radio units.

Figure 12:
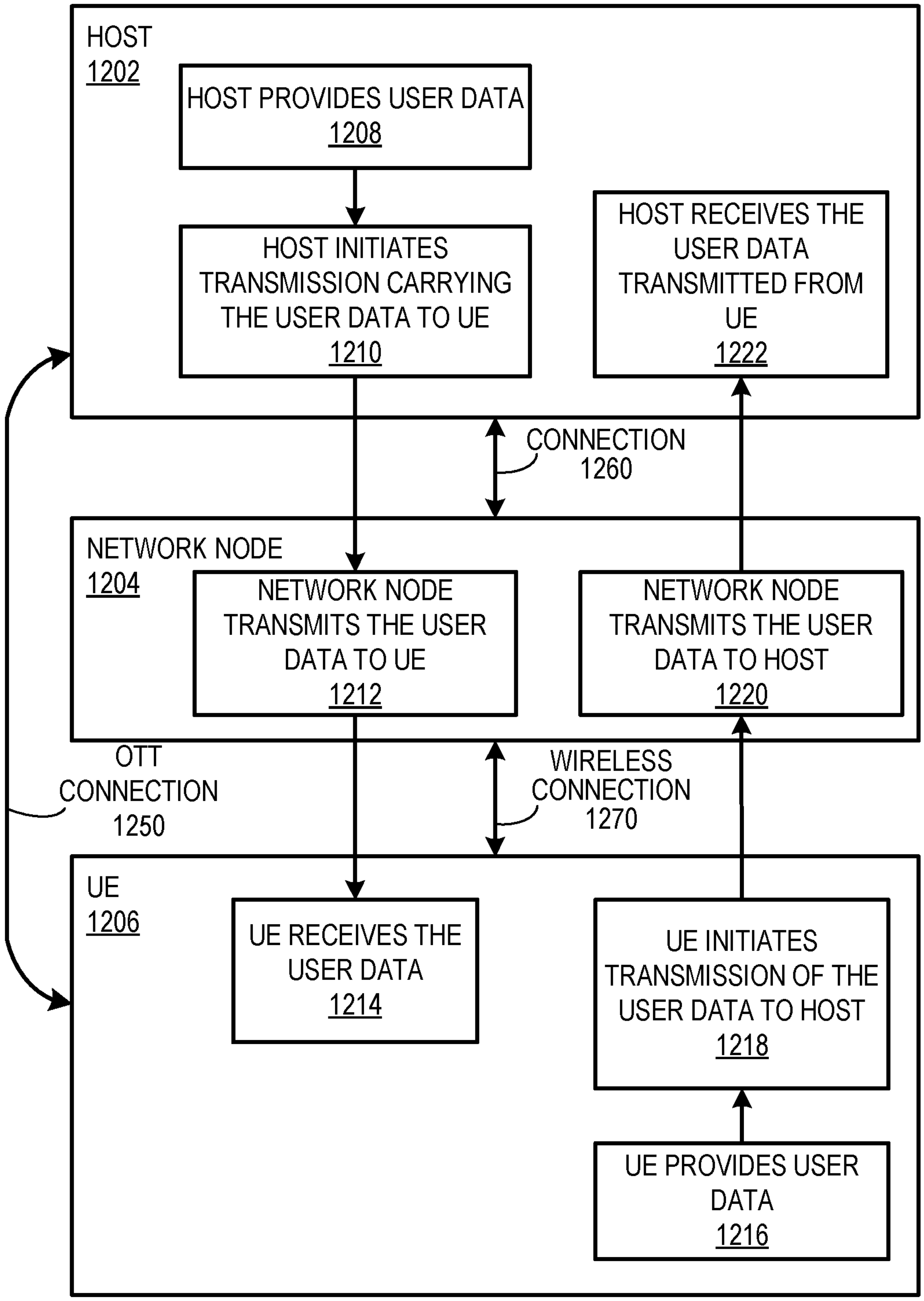
FIG. 12 shows a communication diagram of a host.

FIG. 12 shows a communication diagram of a host 1202 communicating via a network node 1204 with a UE 1206 over a partially wireless connection in accordance with some embodiments. Example implementations, in accordance with various embodiments, of the UE (such as a UE 712*a* of FIG. 7 and/or UE 800 of FIG. 8), network node (such as network node 710*a* of FIG. 7 and/or network node 900 of FIG. 9), and host (such as host 716 of FIG. 7 and/or host 1000 of FIG. 10) discussed in the preceding paragraphs will now be described with reference to FIG. 12.

Like host 1000, embodiments of host 1202 include hardware, such as a communication interface, processing circuitry, and memory. The host 1202 also includes software, which is stored in or accessible by the host 1202 and executable by the processing circuitry. The software includes a host application that may be operable to provide a service to a remote user, such as the UE 1206 connecting via an over-the-top (OTT) connection 1250 extending between the UE 1206 and host 1202. In providing the service to the remote user, a host application may provide user data which is transmitted using the OTT connection 1250.

The network node 1204 includes hardware enabling it to communicate with the host 1202 and UE 1206. The connection 1260 may be direct or pass through a core network (like core network 706 of FIG. 7) and/or one or more other intermediate networks, such as one or more public, private, or hosted networks. For example, an intermediate network may be a backbone network or the Internet.

The UE 1206 includes hardware and software, which is stored in or accessible by UE 1206 and executable by the UE's processing circuitry. The software includes a client application, such as a web browser or operator-specific "app" that may be operable to provide a service to a human or non-human user via UE 1206 with the support of the host 1202. In the host 1202, an executing host application may communicate with the executing client application via the OTT connection 1250 terminating at the UE 1206 and host 1202. In providing the service to the user, the UE's client application may receive request data from the host's host application and provide user data in response to the request data. The OTT connection 1250 may transfer both the request data and the user data. The UE's client application may interact with the user to generate the user data that it provides to the host application through the OTT connection 1250.

The OTT connection 1250 may extend via a connection 1260 between the host 1202 and the network node 1204 and via a wireless connection 1270 between the network node 1204 and the UE 1206 to provide the connection between the host 1202 and the UE 1206. The connection 1260 and wireless connection 1270, over which the OTT connection 1250 may be provided, have been drawn abstractly to illustrate the communication between the host 1202 and the UE 1206 via the network node 1204, without explicit reference to any intermediary devices and the precise routing of messages via these devices.

As an example of transmitting data via the OTT connection 1250, in step 1208, the host 1202 provides user data, which may be performed by executing a host application. In some embodiments, the user data is associated with a particular human user interacting with the UE 1206. In other embodiments, the user data is associated with a UE 1206 that shares data with the host 1202 without explicit human interaction. In step 1210, the host 1202 initiates a transmission carrying the user data towards the UE 1206. The host 1202 may initiate the transmission responsive to a request transmitted by the UE 1206. The request may be caused by human interaction with the UE 1206 or by operation of the client application executing on the UE 1206. The transmission may pass via the network node 1204, in accordance with the teachings of the embodiments described throughout this disclosure. Accordingly, in step 1212, the network node 1204 transmits to the UE 1206 the user data that was carried in the transmission that the host 1202 initiated, in accordance with the teachings of the embodiments described throughout this disclosure. In step 1214, the UE 1206 receives the user data carried in the transmission, which may be performed by a client application executed on the UE 1206 associated with the host application executed by the host 1202.

In some examples, the UE 1206 executes a client application which provides user data to the host 1202. The user data may be provided in reaction or response to the data received from the host 1202. Accordingly, in step 1216, the UE 1206 may provide user data, which may be performed by executing the client application. In providing the user data, the client application may further consider user input received from the user via an input/output interface of the UE 1206. Regardless of the specific manner in which the user data was provided, the UE 1206 initiates, in step 1218, transmission of the user data towards the host 1202 via the network node 1204. In step 1220, in accordance with the teachings of the embodiments described throughout this disclosure, the network node 1204 receives user data from the UE 1206 and initiates transmission of the received user data towards the host 1202. In step 1222, the host 1202 receives the user data carried in the transmission initiated by the UE 1206.

One or more of the various embodiments improve the performance of OTT services provided to the UE 1206 using the OTT connection 1250, in which the wireless connection 1270 forms the last segment. More precisely, the teachings of these embodiments may improve, e.g., the data rate, latency, power consumption and thereby provide benefits such as, e.g., reduced user waiting time, relaxed restriction on file size, improved content resolution, better responsiveness, extended battery lifetime.

In an example scenario, factory status information may be collected and analyzed by the host 1202. As another example, the host 1202 may process audio and video data which may have been retrieved from a UE for use in creating maps. As another example, the host 1202 may collect and analyze real-time data to assist in controlling vehicle congestion (e.g., controlling traffic lights). As another example, the host 1202 may store surveillance video uploaded by a UE. As another example, the host 1202 may store or control access to media content such as video, audio, VR or AR which it can broadcast, multicast or unicast to UEs. As other examples, the host 1202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1250 between the host 1202 and UE 1206, in response to variations in the measurement results. The measurement procedure and/or the network functionality for reconfiguring the OTT connection may be implemented in software and hardware of the host 1202 and/or UE 1206. In some embodiments, sensors (not shown) may be deployed in or in association with other devices through which the OTT connection 1250 passes; the sensors may participate in the measurement procedure by supplying values of the monitored quantities exemplified above, or supplying values of other physical quantities from which software may compute or estimate the monitored quantities. The reconfiguring of the OTT connection 1250 may include message format, retransmission settings, preferred routing etc.; the reconfiguring need not directly alter the operation of the network node 1204. Such procedures and functionalities may be known and practiced in the art. In certain embodiments, measurements may involve proprietary UE signaling that facilitates measurements of throughput, propagation times, latency and the like, by the host 1202. The measurements may be implemented in that software causes messages to be transmitted, in particular empty or 'dummy' messages, using the OTT connection 1250 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The above-described embodiments are intended to be examples only. Alterations, modifications and variations may be effected to the particular embodiments by those of skill in the art without departing from the scope of the description, which is defined solely by the appended claims.

The invention claimed is:

1. A method performed by a user equipment (UE) configured with 8 transmit antenna ports ($N_{TX}$), the method comprising:

receiving a precoding indication which indicates a precoder that is selected from a subset of precoders, the subset of precoders being restricted from a set of precoders, wherein the set of precoders comprises non coherent precoders, partially coherent precoders and fully coherent precoders, and wherein the subset of precoders corresponds to a plurality of precoders associated with $N_{TX}$/Ng transmit antenna ports, where Ng is a number of transmit antenna port groups; and transmitting a data transmission using the indicated precoder to a network node.

2. The method of claim 1, further comprising receiving an indication of a number of transmission layers from the network node.

3. The method of claim 2, wherein the indication indicates a precoder in the subset of precoders for each transmission layer.

4. The method of claim 1, further comprising receiving an indication of the subset of precoders.

5. The method of claim 1, wherein the subset of precoders is determined based on an antenna configuration of the UE.

6. The method of claim 5, wherein the antenna configuration comprises one or more of the number of transmit antenna port groups and coherency of transmit antenna ports in each antenna port group.

7. The method of claim 1, wherein receiving the precoding indication comprises receiving a configuration of a set of indices, each index indicating an available precoder in the subset of precoders and each index being mapped to a transmit precoding matrix index (TPMI).

8. The method of claim 1, wherein the number of transmit antenna port groups is 4 and wherein the subset of precoders corresponds to a plurality of precoders associated with 2 transmit antenna ports, wherein there are 4 subsets of precoders associated with the 4 transmit antenna port groups, and wherein each transmit antenna port group comprises 2 transmit antenna ports and wherein each of the 4 subsets of precoders is fully coherent precoders.

9. The method of claim 1, wherein the number of transmit antenna port groups is 2 and wherein the subset of precoders corresponds to a plurality of precoders associated with 4 transmit antenna ports.

10. The method of claim 1, wherein only precoders from the set of precoders that contain non-zero coefficients for the $N_{TX}$ transmit antenna ports that are mutually coherent, and coefficients of zero for the remaining $N_{TX}$ transmit antenna ports, are part of the subset of precoders.

11. A method performed by a network node in communication with a user equipment (UE) which is configured with 8 transmit antenna ports ($N_{TX}$), the method comprising:
determining a subset of precoders, restricted from a set of precoders, wherein the set of precoders comprises non coherent precoders, partially coherent precoders and fully coherent precoders, and wherein the subset of precoders corresponds to a plurality of precoders associated with $N_{TX}$/Ng transmit antenna ports, where Ng is a number of transmit antenna port groups;
transmitting a precoding indication which indicates a precoder selected from the determined subset of precoders; and
receiving, from the UE, a data transmission using the indicated precoder.

12. The method of claim 11, further comprising transmitting an indication of a number of transmission layers to the UE.

13. The method of claim 12, wherein the indication indicates a precoder in the subset of precoders for each transmission layer.

14. The method of claim 11, further comprising transmitting an indication of the subset of precoders to the UE.

15. The method of claim 11, wherein the subset of precoders is determined based on an antenna configuration of the UE.

16. The method of claim 15, wherein the antenna configuration comprises one or more of the number of transmit antenna port groups and coherency of the transmit antenna ports in each antenna port group.

17. The method of claim 11, wherein transmitting the precoding indication comprises transmitting a configuration of a set of indices, each index indicating an available precoder in the subset of precoders and each index being mapped to a transmit precoding matrix index (TPMI).

18. The method of claim 11, wherein the number of transmit antenna port groups is 4 and wherein the subset of precoders corresponds to a plurality of precoders associated with 2 transmit antenna ports, wherein there are 4 subsets of precoders associated with the 4 transmit antenna port groups, and wherein each transmit antenna port group comprises 2 transmit antenna ports and wherein each of the 4 subsets of precoders is fully coherent precoders.

19. The method of claim 11, wherein the number of transmit antenna port groups is 2 and wherein the subset of precoders corresponds to a plurality of precoders associated with 4 transmit antenna ports.

20. A user equipment (UE) configured with 8 transmit antenna ports ($N_{TX}$) comprising processing circuitry and a network interface connected thereto, the processing circuitry configured to:
receive a precoding indication which indicates a precoder that is selected from a subset of precoders, the subset of precoders being restricted from a set of precoders, wherein the set of precoders comprises non coherent precoders, partially coherent precoders and fully coherent precoders, and wherein the subset of precoders corresponds to a plurality of precoders associated with $N_{TX}$/Ng transmit antenna ports, where Ng is a number of transmit antenna port groups; and
transmit a data transmission using the indicated precoder to a network node.

* * * * *